(12) United States Patent
Booher et al.

(10) Patent No.: US 11,753,090 B2
(45) Date of Patent: Sep. 12, 2023

(54) HALF-ROUND TRAILER

(71) Applicant: East Manufacturing Corporation, Randolph, OH (US)

(72) Inventors: Howard D. Booher, Atwater, OH (US); Derek T. Davies, Louisville, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 17/534,311

(22) Filed: Nov. 23, 2021

(65) Prior Publication Data

US 2022/0185395 A1 Jun. 16, 2022

Related U.S. Application Data

(60) Provisional application No. 63/117,852, filed on Nov. 24, 2020.

(51) Int. Cl.
*B62D 35/00* (2006.01)
*B62D 21/20* (2006.01)
(Continued)

(52) U.S. Cl.
CPC ............... *B62D 35/02* (2013.01); *B60P 1/28* (2013.01); *B62D 21/20* (2013.01); *B62D 53/06* (2013.01); *B62D 63/06* (2013.01)

(58) Field of Classification Search
CPC ...... B62D 21/20; B62D 33/02; B62D 35/001; B62D 35/02; B62D 53/06; B62D 63/06;
(Continued)

(56) References Cited

U.S. PATENT DOCUMENTS 1,805,489 A 5/1931 Kerr et al.
1,883,936 A * 10/1932 Kerr .................... B60P 1/24
298/17 R (Continued)

OTHER PUBLICATIONS

Photograph of East Tub Dump Trailer, date unknown.
Photograph of Fruehauf Dump Trailer, date unknown.

*Primary Examiner* — Gregory A Blankenship
(74) *Attorney, Agent, or Firm* — Lippes Mathias LLP

(57) ABSTRACT

A trailer includes a chassis with at least one axle including left and right wheel and tire assemblies that support the chassis for rolling movement on a surface. A body is supported on the chassis and includes: (i) left and right sidewalls spaced apart from each other and respectively located on opposite left and right lateral sides of the body; (ii) a curved floor that extends between the left and right sidewalls; (iii) a bulkhead located at a front end of the body and extending between the left and right sidewalls; (iv) a tailgate located a rear end of the body and extending between the left and right sidewalls, the tailgate movable relative to the left and right sidewalls between an opened position and a closed position; (v) an open-top cargo space for containing an associated bulk commodity defined between the left and right sidewalls, the floor, the bulkhead, and the tailgate, wherein a dump opening of the cargo space is defined between the left and right sidewalls and is blocked by the tailgate when the tailgate is in its closed position and is at least partially unblocked when the tailgate is in its opened position. The bulkhead includes a one-piece aluminum alloy bulkhead sheet formed into a three-panel shape comprising a left panel, a right panel, and a central panel. The bulkhead includes opposite inner and outer sides, with the inner side oriented toward the cargo space. A respective obtuse angle is defined between the central panel and each of the left and right panels on the inner side of the bulkhead.

17 Claims, 14 Drawing Sheets

(51) Int. Cl.
  *B62D 53/06* (2006.01)
  *B62D 63/06* (2006.01)
  *B60P 1/28* (2006.01)
  *B62D 35/02* (2006.01)

(58) Field of Classification Search
  CPC .... B60P 1/04; B60P 1/28; B60P 1/286; B60P 3/2205; B60P 3/22; B60P 3/221
  See application file for complete search history.

(56) References Cited

U.S. PATENT DOCUMENTS

| | | | |
|---|---|---|---|
| 3,093,254 A | 6/1963 | Sammarco | |
| 3,844,616 A * | 10/1974 | Acker | B60P 1/165 |
| | | | 298/10 |
| 4,619,484 A | 10/1986 | Maxey | |
| 4,883,321 A * | 11/1989 | Voigt | B62D 53/062 |
| | | | 298/17.7 |
| 5,090,773 A | 2/1992 | Guillaume | |
| 5,322,350 A | 6/1994 | Hinson | |
| 5,454,620 A | 10/1995 | Hill et al. | |
| 5,482,356 A | 1/1996 | Goodson, Jr. | |
| 5,738,479 A | 4/1998 | Glen et al. | |
| 6,142,554 A | 11/2000 | Carroll et al. | |
| 6,554,367 B2 | 4/2003 | Jensen | |
| 6,719,360 B1 | 4/2004 | Backs | |
| 7,992,943 B2 | 8/2011 | Westner | |
| 8,220,874 B2 | 7/2012 | Heider et al. | |
| 8,303,044 B2 * | 11/2012 | Obermeyer | B60P 1/28 |
| | | | 298/22 R |
| 8,376,381 B2 | 2/2013 | Shalaby et al. | |
| 8,550,542 B1 * | 10/2013 | Booher | B62D 33/02 |
| | | | 296/183.1 |
| 9,085,331 B1 | 7/2015 | McWilliams | |
| 9,283,998 B2 | 3/2016 | Kibler et al. | |
| 9,315,136 B2 | 4/2016 | Kibler | |
| 9,469,352 B2 | 10/2016 | Booher et al. | |
| 9,718,502 B2 * | 8/2017 | Kibler | B62D 35/02 |
| 10,661,694 B2 * | 5/2020 | Kibler | B60P 1/28 |
| 10,792,719 B2 * | 10/2020 | Maiorana | B62D 33/023 |
| 11,427,262 B1 * | 8/2022 | McWilliams | B62D 27/026 |
| 2008/0143142 A1 | 6/2008 | Lemmons | |
| 2009/0322058 A1 * | 12/2009 | Shannon | B60S 9/04 |
| | | | 280/433 |
| 2015/0035314 A1 * | 2/2015 | Kibler | B60P 1/16 |
| | | | 296/183.2 |
| 2015/0061318 A1 * | 3/2015 | Kibler | B62D 21/20 |
| | | | 296/180.4 |
| 2016/0193950 A1 | 7/2016 | Kibler | |
| 2017/0297635 A1 | 10/2017 | Kibler et al. | |
| 2018/0009488 A1 | 1/2018 | Kibler et al. | |
| 2018/0015863 A1 | 1/2018 | Kibler | |
| 2018/0290579 A1 * | 10/2018 | Maiorana | B21D 35/006 |
| 2018/0290580 A1 | 10/2018 | Maiorana | |
| 2018/0290692 A1 | 10/2018 | Maiorana | |
| 2018/0362100 A1 | 12/2018 | Maiorana | |
| 2019/0193619 A1 | 6/2019 | Kibler | |
| 2019/0315261 A1 * | 10/2019 | Maiorana | B62D 33/023 |
| 2022/0185395 A1 * | 6/2022 | Booher | B62D 21/20 |

* cited by examiner

HALF-ROUND TRAILER

BRIEF DESCRIPTION OF THE DRAWINGS

This application claims priority from and benefit of the filing date of U.S. provisional application Ser. No. 63/117,852 filed Nov. 24, 2020, and the entire disclosure of said provisional application is hereby expressly incorporated by reference into the present specification.

BACKGROUND

Aluminum dump trailers are well-known and in widespread use. Manufacturers and users of aluminum dump trailers are continuously seeking improvements in terms of durability, cost of manufacture, weight savings and aerodynamics for fuel efficiency, and handling characteristics in terms of drivability and stability during dumping. As such, a need has been identified for a new and improved dump trailer that provides advantages with respect to these and other characteristics while providing superior overall results.

SUMMARY

According to a first aspect of the present development, a trailer includes a chassis comprising at least one axle with left and right wheel and tire assemblies that support the chassis for rolling movement on a surface. A body is supported on the chassis and comprises: (i) left and right sidewalls spaced apart from each other and respectively located on opposite left and right lateral sides of the body; (ii) a curved floor that extends between the left and right sidewalls; (iii) a bulkhead located at a front end of the body and extending between the left and right sidewalls; (iv) a tailgate located a rear end of the body and extending between the left and right sidewalls, said tailgate movable relative to the left and right sidewalls between an opened position and a closed position; (v) an open-top cargo space for containing an associated bulk commodity defined between the left and right sidewalls, the floor, the bulkhead, and the tailgate, wherein a dump opening of the cargo space is defined between the left and right sidewalls and is blocked by the tailgate when the tailgate is in its closed position and is at least partially unblocked when the tailgate is in its opened position. The bulkhead comprises a one-piece aluminum alloy bulkhead sheet formed into a three-panel shape comprising a left panel, a right panel, and a central panel. The bulkhead includes opposite inner and outer sides, with the inner side oriented toward the cargo space. A respective obtuse angle is defined between the central panel and each of the left and right panels on the inner side of the bulkhead.

BRIEF DESCRIPTION OF THE DRAWINGS

Figure 1:
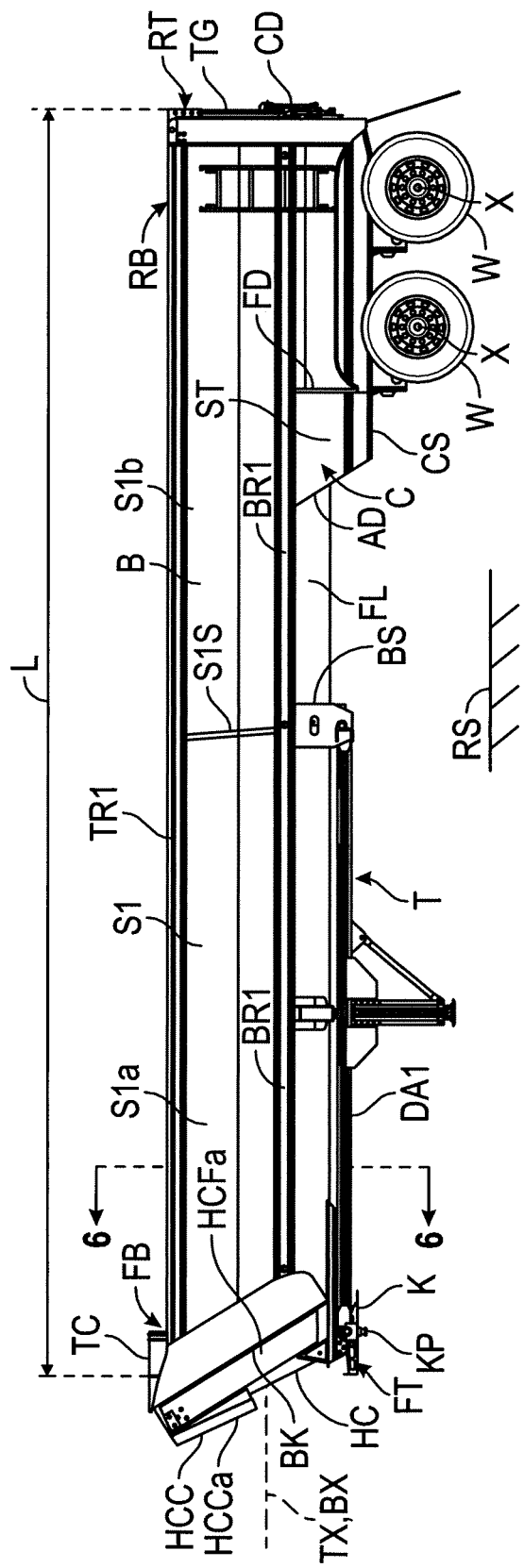
Figure 2:
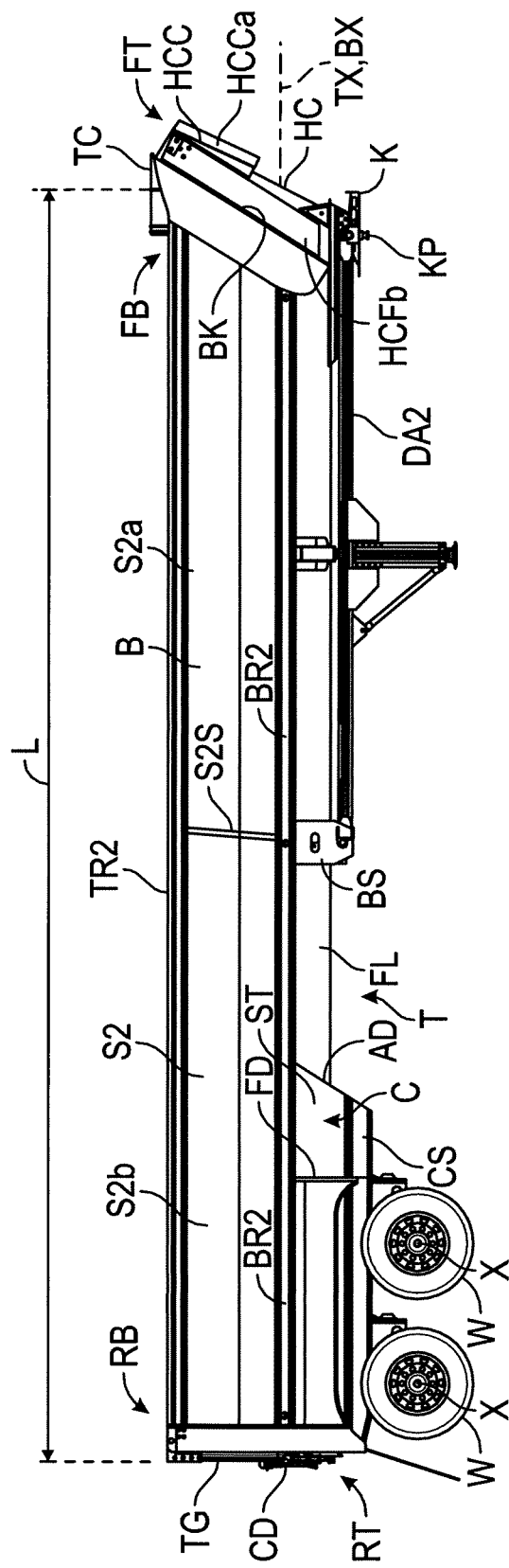

FIGS. 1 & 2 are respective left side (driver side) and right side (passenger side) views of a trailer formed in accordance with the present development.

Figure 3:
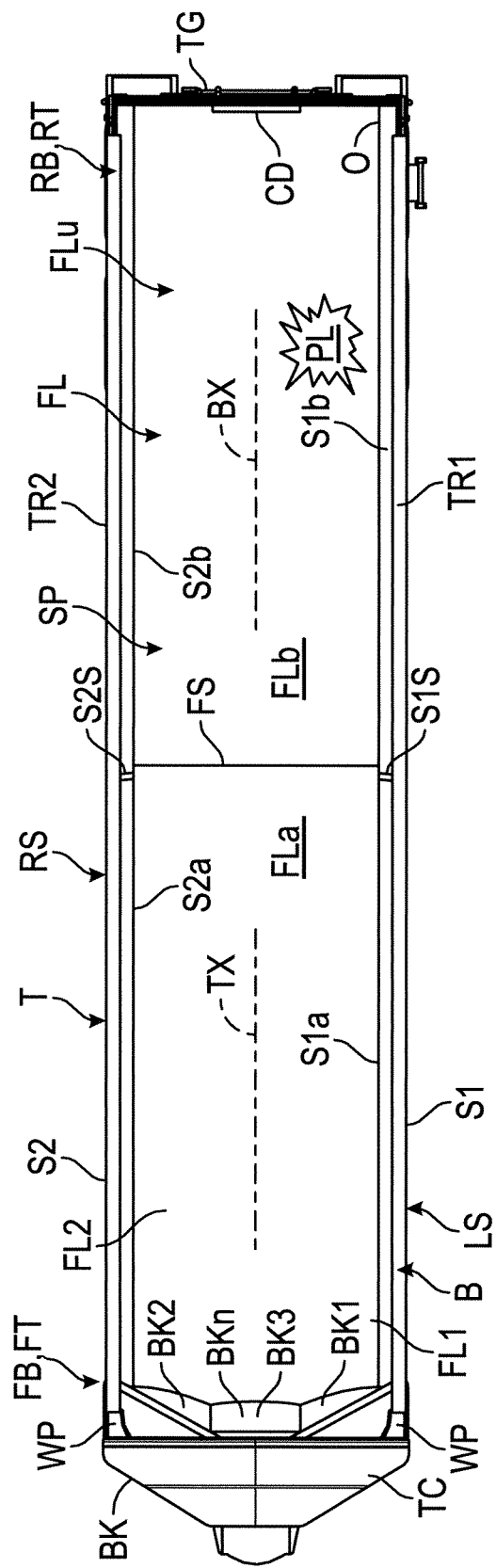
Figure 4:
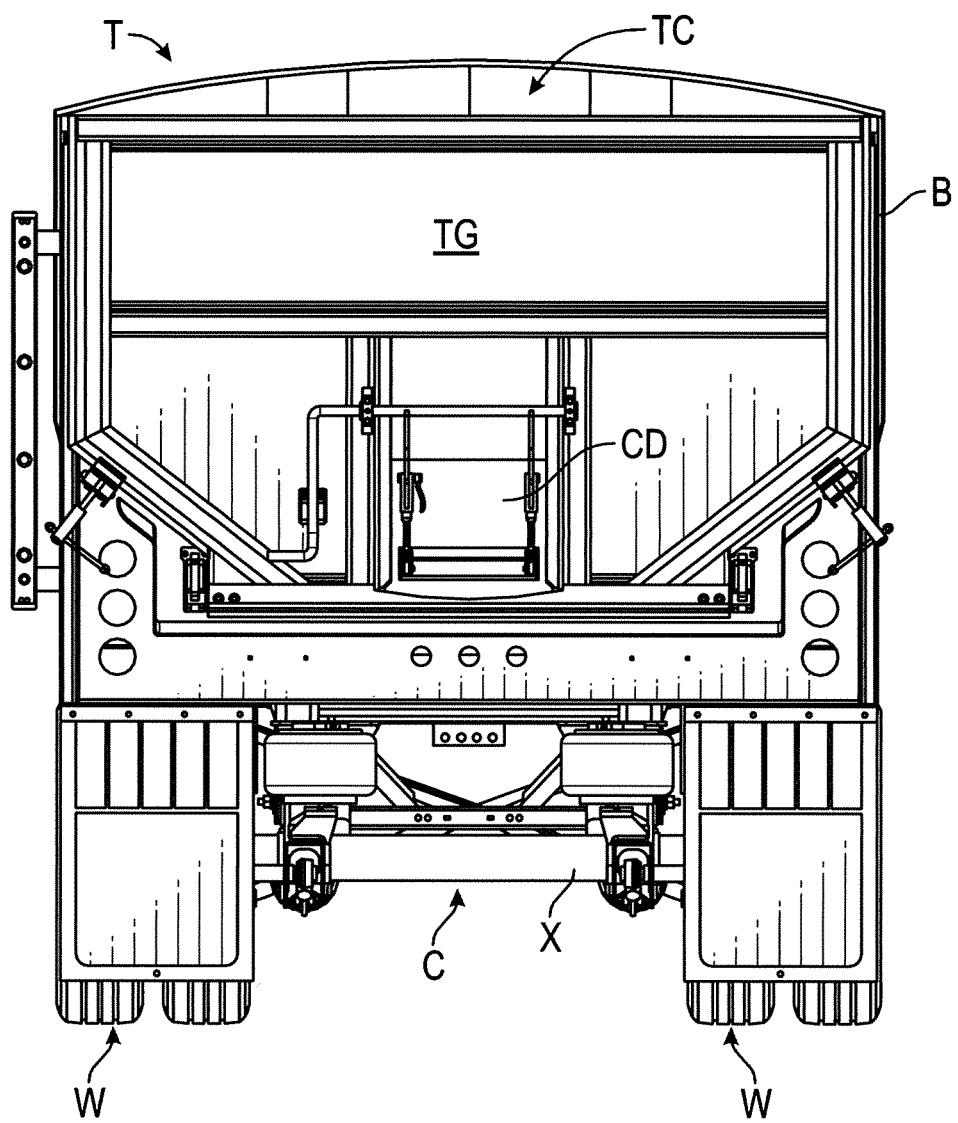
Figure 5:
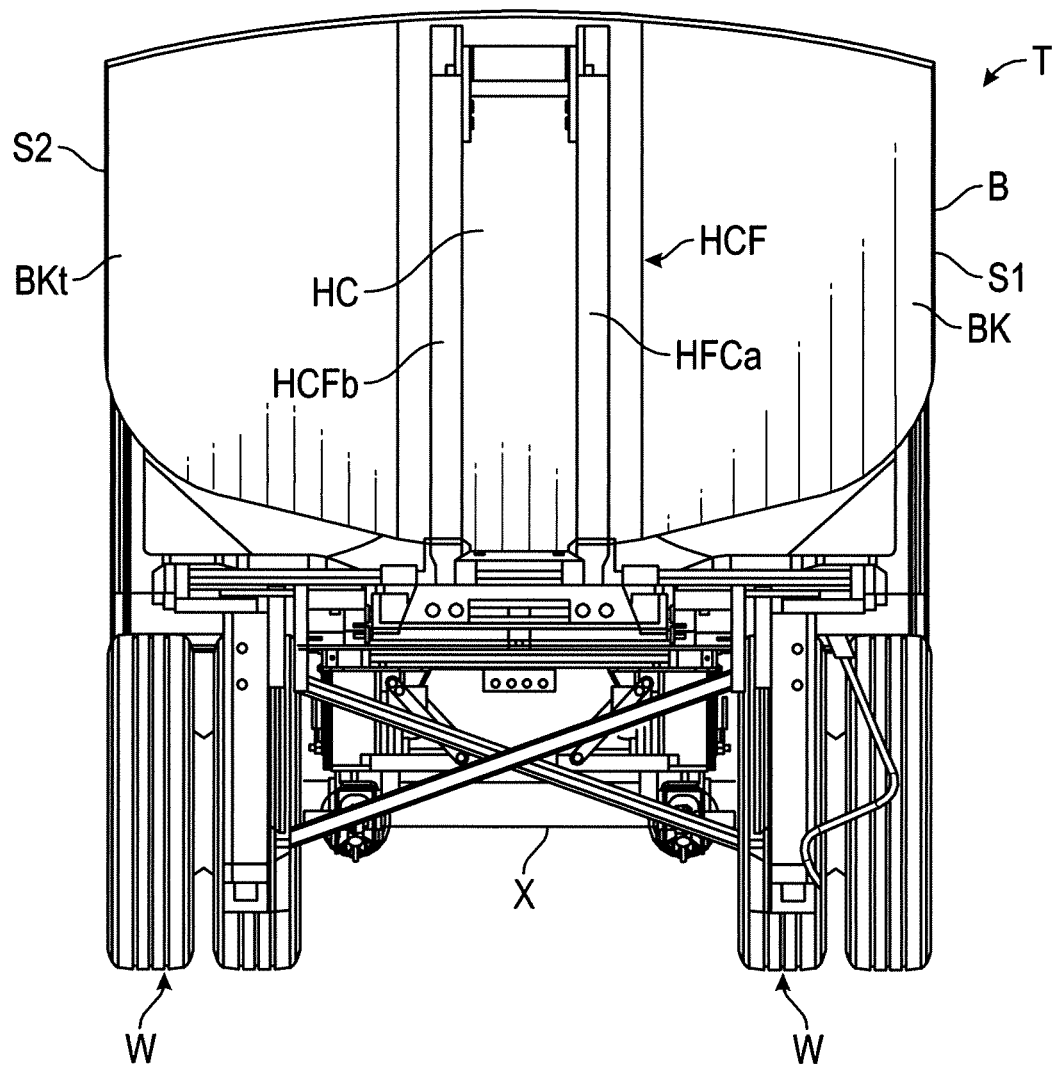

FIGS. 3, 4, & 5 show top, rear, and front views of the trailer of FIGS. 1 & 2, respectively.

Figure 3A:
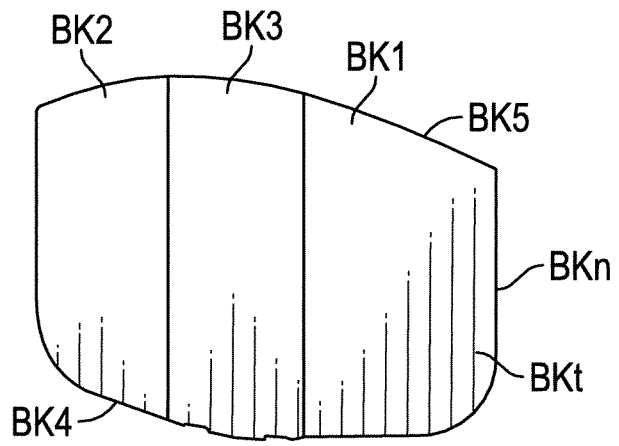
Figure 3B:
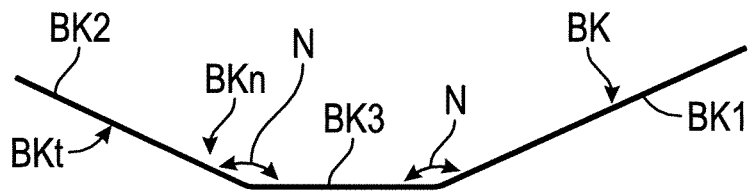
Figure 3C:
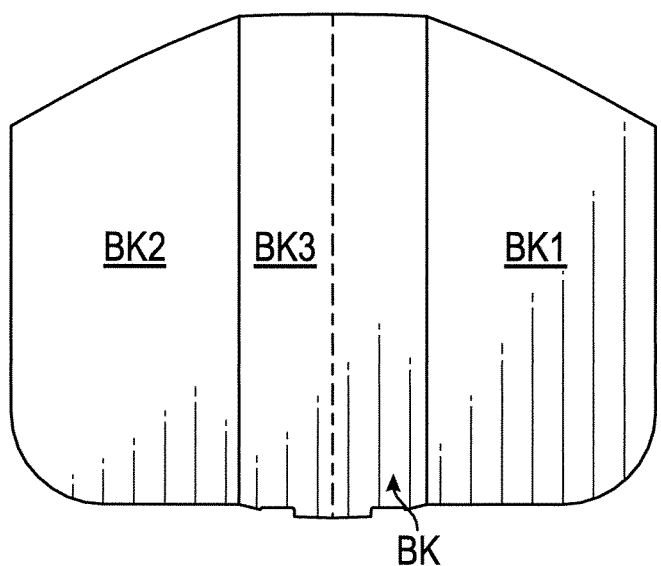

FIGS. 3A, 3B, & 3C respectively show isometric, top, and front views of a bulkhead of the trailer.

Figure 5A:
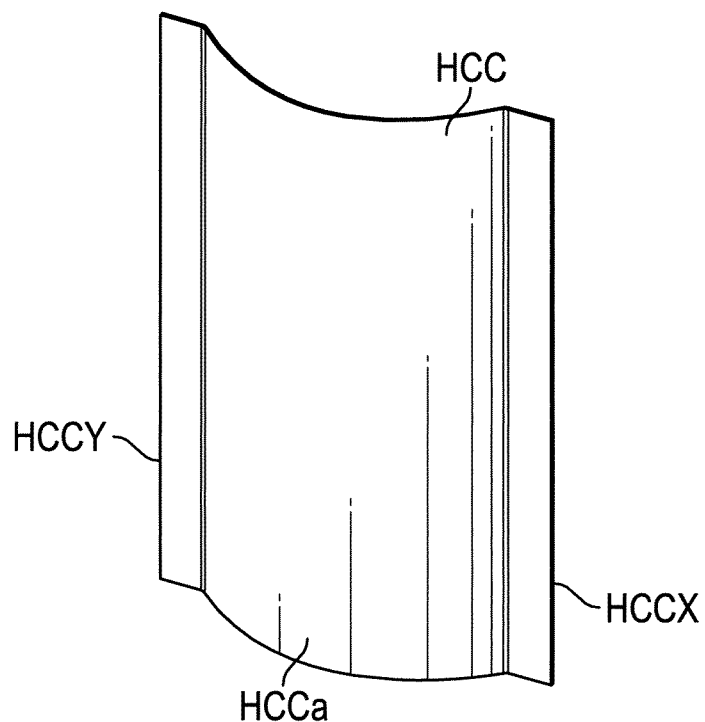
Figure 5B:
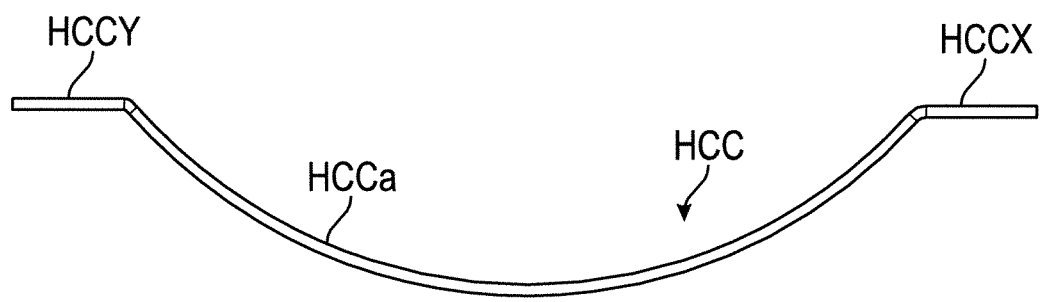

FIGS. 5A & 5B respectively show isometric and top views of the hydraulic cylinder cover of the trailer.

Figure 6:
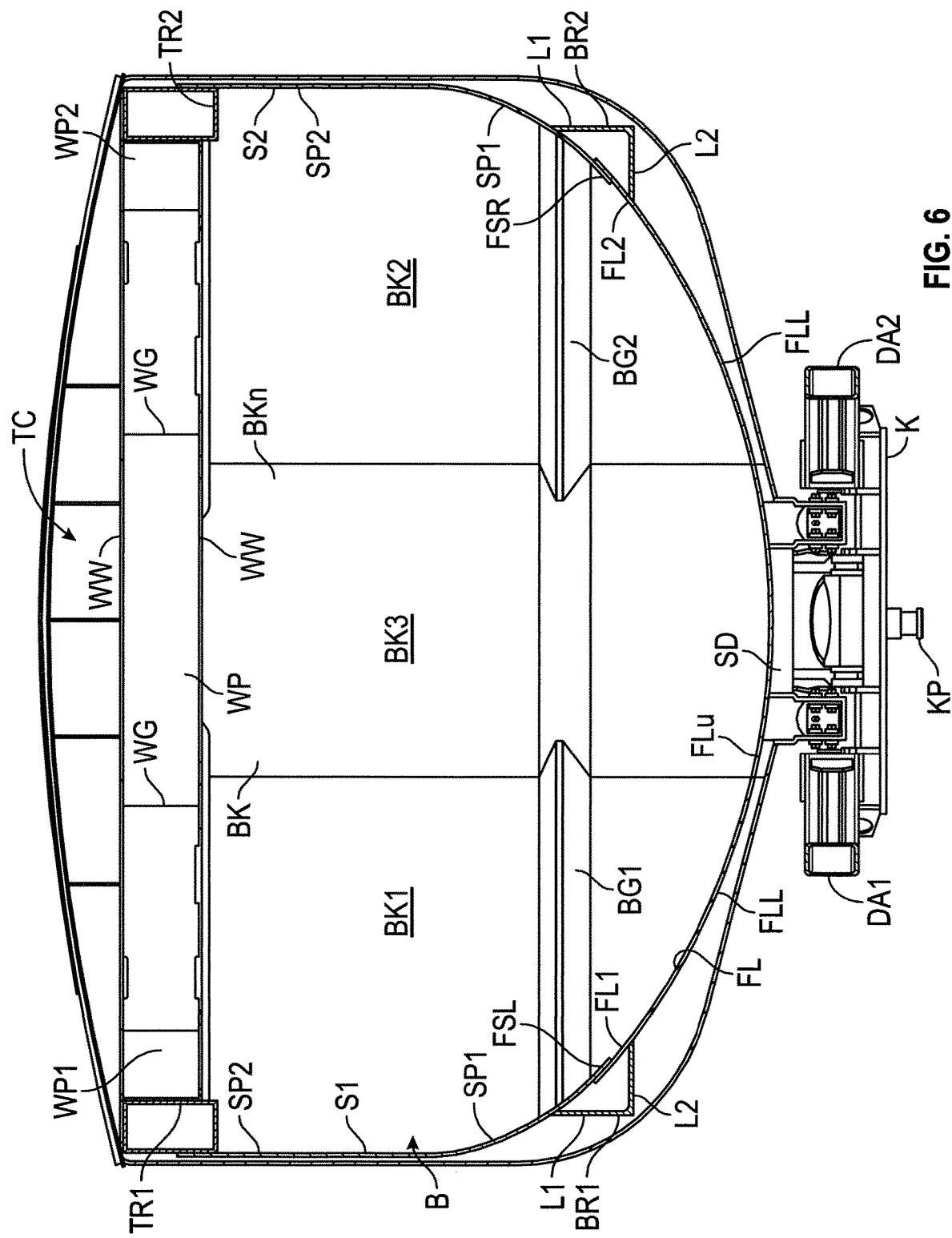

FIG. 6 provides a section view of the trailer as taken at line 6-6 of FIG. 1.

Figure 6A:
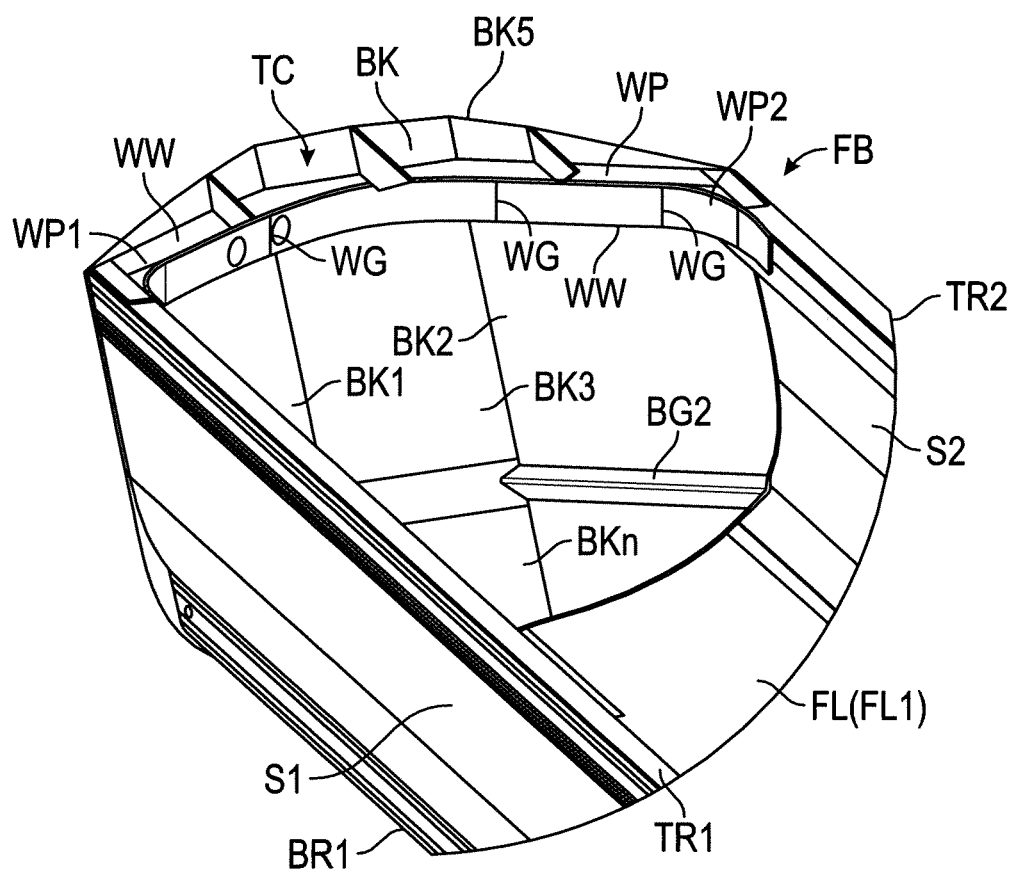

FIG. 6A is similar to FIG. 6 but provides an isometric section view.

Figure 6B:
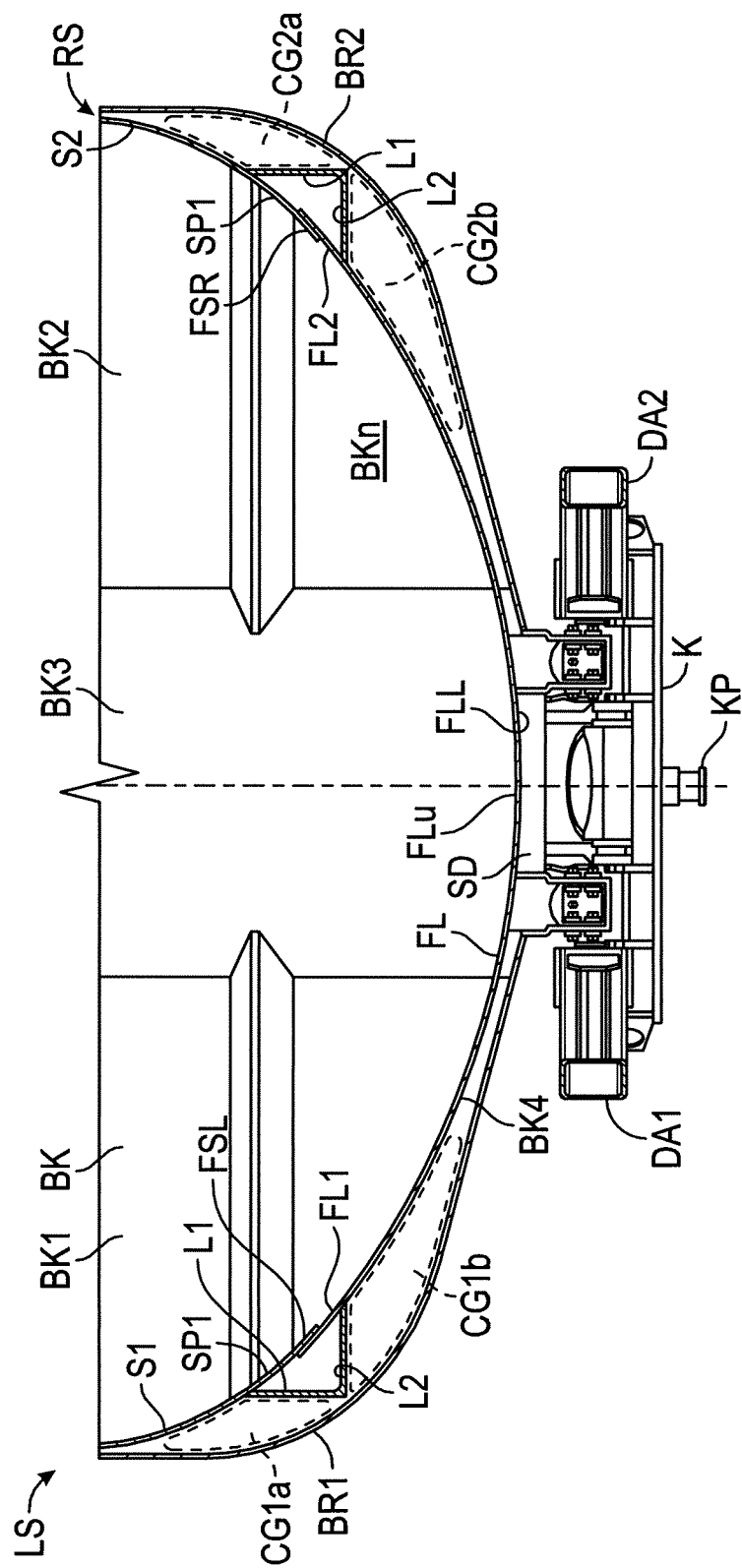

FIG. 6B is an enlarged portion of FIG. 6.

Figure 7:
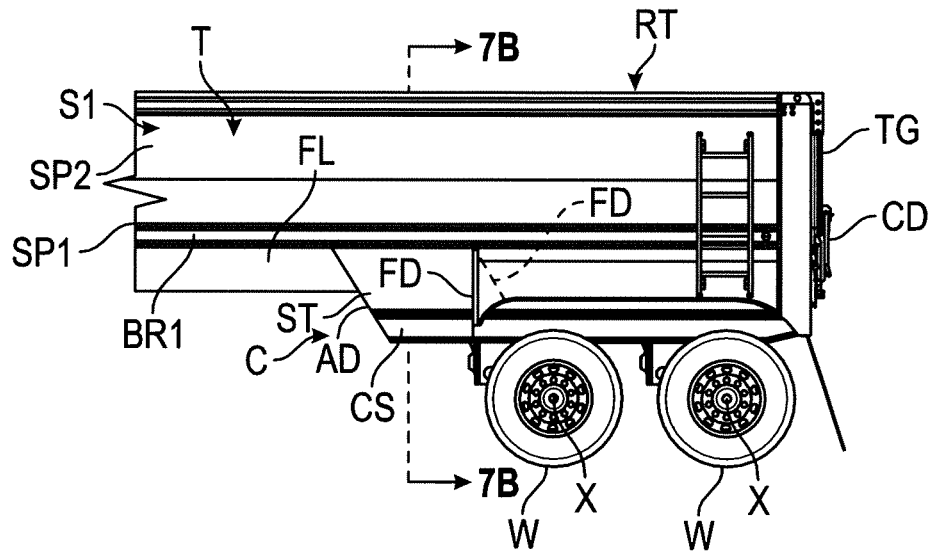

FIG. 7 provides a partial left side view of the rear of the trailer.

Figure 7A:
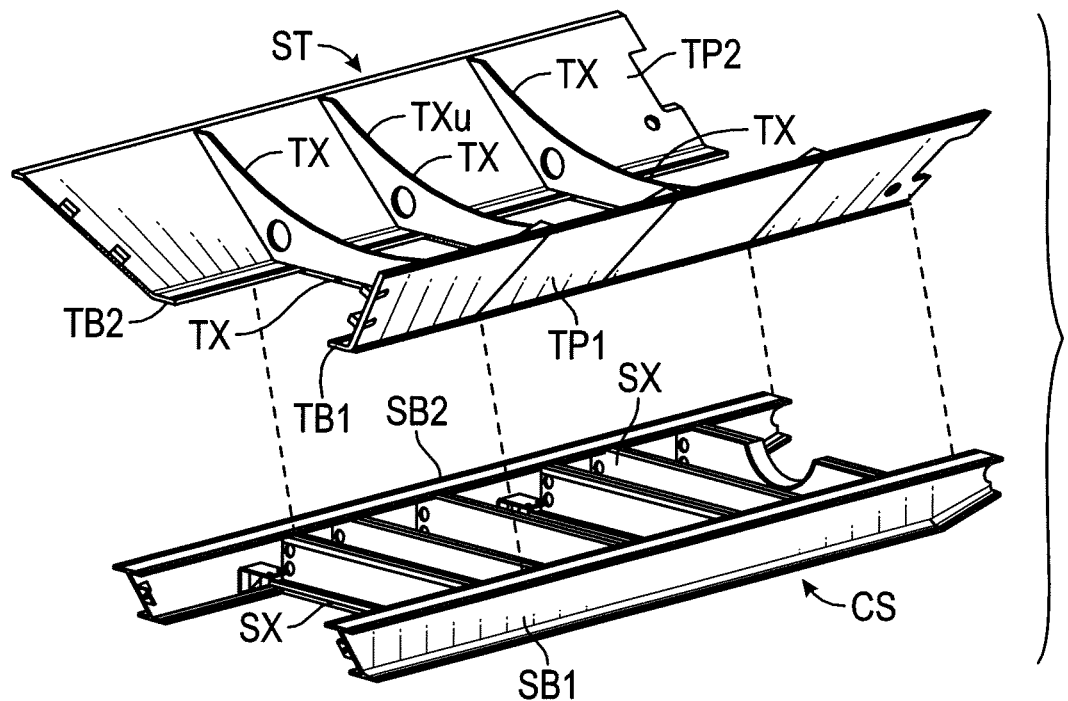

FIG. 7A is an exploded isometric view of part of the chassis of the trailer including a chassis subframe and a subframe tower.

Figure 7B:
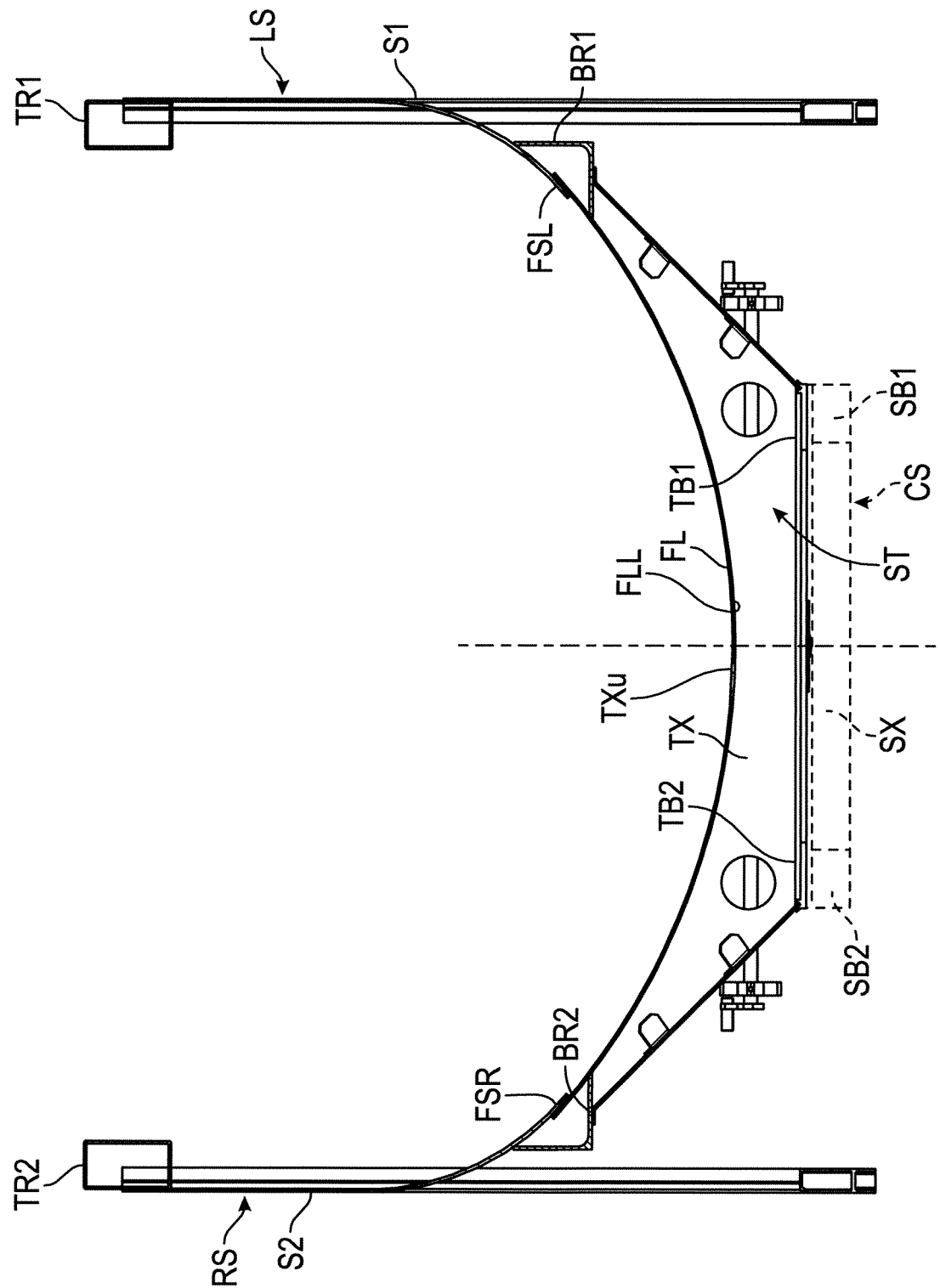

FIG. 7B is a simplified section view as taken a line 7B-7B of FIG. 7.

Figure 8:
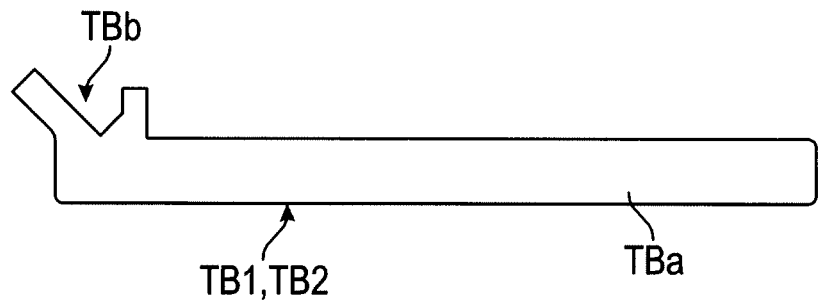

FIG. 8 is an end view of a tower base portion of the subframe tower of FIGS. 7A & 7B.

Figure 9:
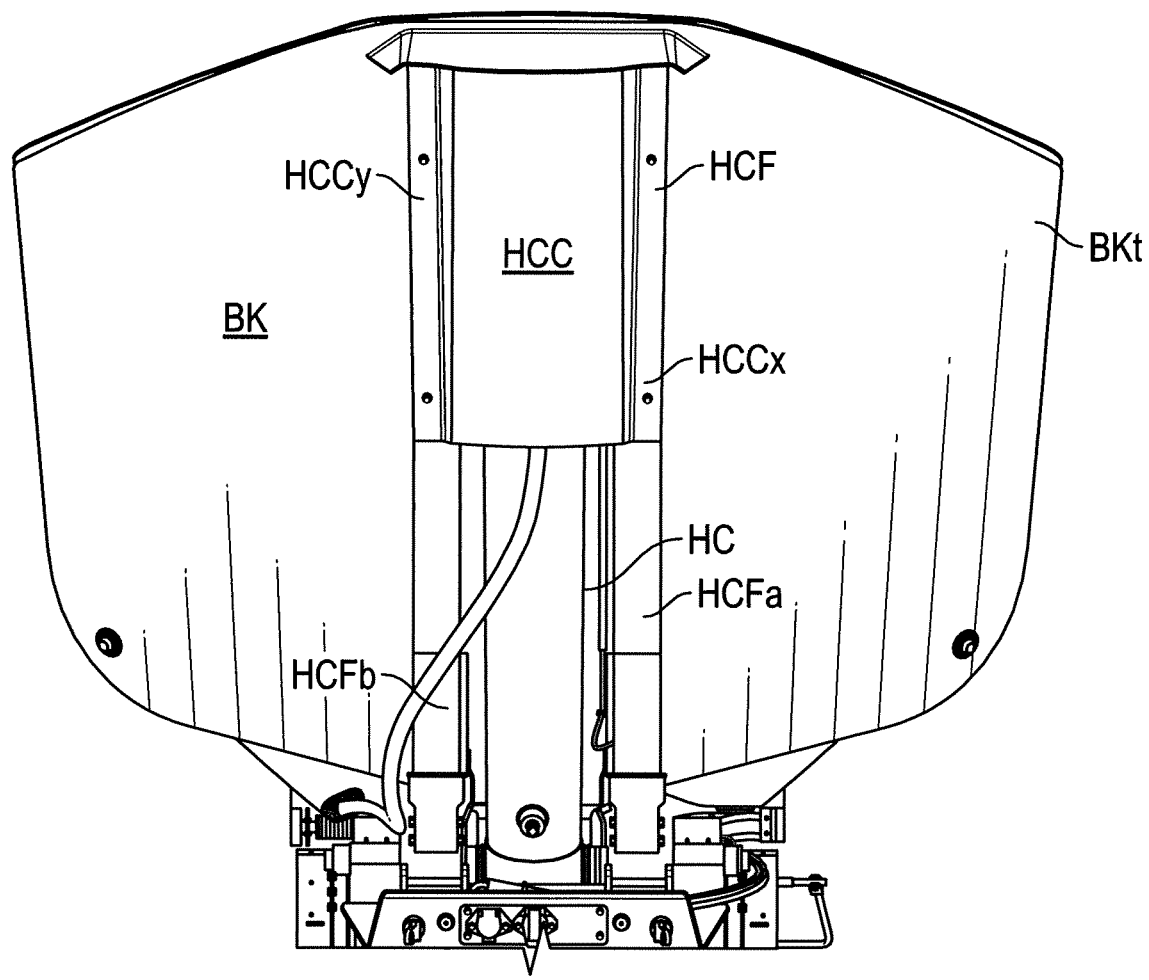

FIG. 9 is a front view of the trailer.

Figure 10:
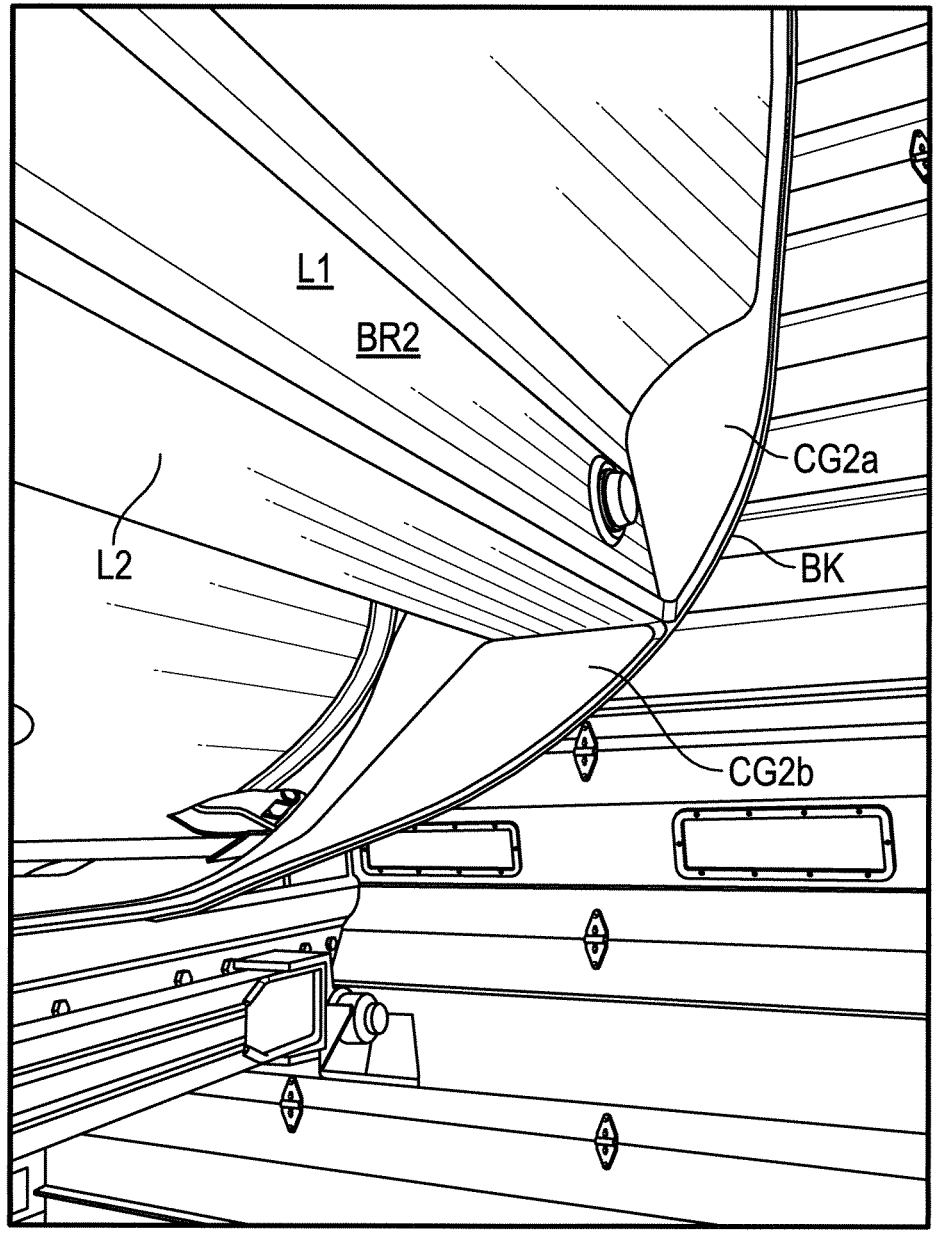

FIG. 10 shows the connection of the right bottom rail to the bulkhead.

DETAILED DESCRIPTION

Referring to the drawings, it can be seen that the trailer T comprises a body B that defines an open-top cargo space SP (FIG. 3) adapted for containing and hauling bulk commodities such as grain, beans, sand, salt, coal, rocks, construction materials or debris, or the like. The body B comprises left (first) and right (second) sidewalls S1,S2 that are spaced-apart from each other and located respectively on or adjacent opposite left and right lateral sides LS,RS of the body B. The body B further comprises a front wall or bulkhead BK located at a front end TF of the trailer T and that extends between and interconnects the left and right sidewalls S1,S2. The bulkhead BK is located at and closes a forward end of the cargo space SP at a front end or forward end FB of the body B. The bulkhead BK is shown separately in FIGS. 3A-3C and comprises a one-piece bulkhead sheet of aluminum alloy formed into the illustrated "three-panel" shape or similar to comprise left, right and central (center) panels BK1,BK2,BK3 that are each flat or planar. The bulkhead BK comprises opposite inner and outer sides or surfaces BKn, BKt. The inner surface BKn is oriented inward toward the cargo space SP and the left, right, and central panels are arranged or formed relative to each other such that a respective obtuse angle N is defined between the central panel BK3 and each of the left and right panels BK1,BK2 at the inner surface BKn. The bulkhead BK (bulkhead sheet) is preferably arranged in a forward sloping orientation such that its lower edge BK4 is located rearward (closer to the trailer tailgate TG) as compared to its upper edge BK5. As shown in FIG. 6, the sloped, one-piece, three-panel structure of the bulkhead BK provides the front end FB of the body B with an aerodynamic shape in which the left and right panels BK1,BK2 diverge outwardly away from the central panel BK3 in opposite directions as they extend rearwardly relative to the central panel BK3.

The body B also includes a tailgate TG located at a back or rear end TR of the trailer T and that extends between the body sidewalls S1,S2 to close a rear cargo dump opening O (FIG. 3) located at the rear end RB of the body B between the left and right sidewalls S1,S2. The tailgate TG is therefore located at a rear end RB of the body B, axially spaced from the front bulkhead BK, and is pivotally or otherwise moveably connected adjacent the left sidewall S1 and/or right sidewall S2 and pivots about a vertical and/or horizontal axis between a closed position (illustrated) where it blocks the rear opening O of the cargo space SP between the sidewalls S1,S2 and an opened position where the rear opening is at least partially unblocked for dumping a load contained in the cargo space SP through the rear opening O of the cargo space SP when the front end FB of the body is elevated relative to the rear end RB of the body. The tailgate TG comprises a wall structure of any desired construction and can include a coal door CD provided therein that is selectively openable independently of the tailgate TG, itself, to facilitate dumping of the contents of the cargo space SP therethrough without opening or pivoting the entire tailgate TG to control the flow of the material being dumped from the rear opening O of the cargo space SP. The tailgate TG typically lies in a vertical plane that perpendicularly intersects the sidewalls S1,S2 but can be angled relative to such a vertical plane. The bulkhead BK can be arranged parallel to the tailgate or can be angled from vertical as desired such as in the illustrated embodiment where the bulkhead BK slopes forwardly away from the from tailgate as it extends upward from the floor FL.

A hydraulic lift cylinder frame HCF is provided adjacent the outer surface BKt bulkhead BK, outside of the cargo space SP. The frame HCF comprises spaced-apart left and right cylinder mounting beams HCFa,HCFb. A hydraulic cylinder HC is operably connected to the frame HCF between the frame beams HCFa,HCFb and is selectively extensible to elevate the forward end FB of the trailer body B relative to the rear end RB of the body for dumping a payload from the cargo space SP through the open tailgate TG (or open coal door CD). As shown in FIGS. 1 & 2 and also in FIG. 9, the body B can comprise a smoothly curved hydraulic cylinder cover HCC (not shown in FIG. 5) that at least partially covers the hydraulic lift cylinder HC for aesthetics and to reduce aerodynamic drag. The curved cover HCC is shown separately in FIGS. 5A & 5B and comprises a curved central body or central portion HCCa that includes an outer convexly curved surface oriented away from the hydraulic cylinder HC and opposite left and right mounting flanges HCCx,HCCy by which the cover HCC is mounted with fasteners to the hydraulic cylinder frame structure HCF. In particular, the left and right mounting flanges HCCx,HCCy are respectively connected to the left and right cylinder mounting beams HCFa,HCFb by fasteners or otherwise and the curved central portion HCCa extends between the left and right cylinder mounting beams HCGa,HCFb.

The trailer T comprise a longitudinal trailer axis TX that extends axially between the opposite front and rear ends FT,RT of the trailer T, and the body B comprises a longitudinal body axis BX that extends axially between the opposite front and rear ends FB,RB of the body B. The trailer axis TX and body axis BX are parallel with respect to each other and can be coincident.

The body B comprises a left (first) bottom rail BR1 located adjacent the left side LS of the body B and provided by a monolithic extrusion of aluminum alloy that extends along the left sidewall S1 for substantially the entire axial length L of the body B between the forward end FB and rear end RB. Similarly, the body B comprises a right (second) bottom rail BR2 located adjacent the right side RS of the body B and provided by a monolithic extrusion of aluminum alloy that extends along the right sidewall S2 for substantially the entire axial length L of the body B between the forward end FB and rear end RB. Referring also to the section view of FIG. 6, the left and right bottom rails BR1,BR2 are thus located in a parallel, spaced-apart arrangement relative to each other and can be defined by an identical extrusion or other elongated structure oriented in a mirror image fashion with respect to each other. Both the left and right bottom rails BR1,BR2 are oriented parallel to the longitudinal axis TX,BX of the trailer and body. As shown herein, the left and right bottom rails each comprises a 90-degree L-shaped angle structure including first and second legs L1,L2 that intersect at a 90-degree angle such that the outer ends of the legs L1,L2 define a cradle structure, with the first leg L1 welded to the sidewall S1,S2 and the second leg L2 welded to the floor FL.

In general, the body B comprises a "half-round" or "tub" structure defined from multiple sheets of aluminum alloy (also sometimes referred to herein as "aluminum") formed into curved sheet structures that are welded or otherwise connected together to partially define the body B. More particularly, referring particularly to the top view of FIG. 3 and the section views of FIGS. 6, 6A, and 6B, it can be seen that the body B comprises a floor FL that extends laterally between the left and right bottom rails BR1,BR2, with a left edge FL1 of the floor located adjacent the left bottom rail BR1 and an opposite right edge FL2 of the floor located adjacent the right bottom rail BR2. The floor FL also extends axially forward and rearward between the bottom edge BK4 of the bulkhead BK and the bottom of the tailgate TG. The upper edge BK5 of the bulkhead BK is spaced above the floor and located forwardly farther away from the tailgate TG) as compared to the bottom edge BK4 of the bulkhead BK. In the illustrated example, the floor FL comprises one or more aluminum sheets such as the illustrated front (first) and rear (second) aluminum floor sheets FLa,FLb that are welded or otherwise affixed together at a primary floor seam FS that extends between the left and right sidewalls S1,S2 and the left and right bottom rails BR1,BR2. The floor FL is defined with a radius or is otherwise curved such that it comprises a concave inner or upper surface FLU oriented upward and toward the cargo space SP and an opposite convex outer or lower surface FLL oriented downwardly toward the roadway or other surface RS on which the trailer T is supported.

The body B defines an axial length L between the bulkhead BK and the tailgate TG, which can be measured at the floor FL, at the open top of the trailer, or at any vertical height between the floor and open top, in all cases parallel to the longitudinal axis BX of the body B and longitudinal axis TX of trailer T. In one example, the axial length L is measured as a maximum distance between the tailgate and the bulkhead BK when measured parallel to the body axis BX.

The body B and, more particularly, the floor FL thereof is supported on a chassis C. As shown, the chassis C is a partial length, "frameless" type that extends under only a part of the axial length L of the body B. Left and right draft arms DA1,DA2 are respectively pivotally connected adjacent the opposite left and right lateral sides LS,RS of the body B, generally near the mid-point of the axial length L, and extend forward under the floor FL outside the cargo space SP to a location adjacent the bulkhead BK where they are each connected to a kingpin plate K including a kingpin KP adapted to be connected to a fifth wheel of an associated truck tractor for towing the trailer T. The hydraulic cylinder HC noted above is operably connected between and adapted to act between to the lift cylinder frame HCF and the kingpin plate K, with a rod of the cylinder HC operably connected to one of the frame HCF and the kingpin plate K and a body of the cylinder HC connected to the other, such that the hydraulic cylinder HC can be selectively extended to elevate the forward end FB of the trailer body B relative to the rear end RB of the body for dumping a payload from the cargo space SP through the open tailgate TG (or open coal door CD). In the exemplary embodiment, the respective inner ends of the left and right draft arms DA1,DA2 are pivotally connected to opposite left and right sides of a main bolster BS that is connected to and located beneath the floor FL and that extends laterally across the trailer body B from the left bottom rail BR1 to the right side bottom rail BR2 and that supports the floor FL in a cradle-like fashion. The bolster BS comprises an aluminum support brace that is shaped to conform to the lower surface FLL of the floor FL so that it supports the floor FL. Forces exerted on the draft arms DA1,DA2 are transmitted into the bolster BS and are then distributed axially along the left and right bottom rails BR1,BR2. In the illustrated example, the bolster BS is located along the trailer body axis BX where it overlaps the floor seam FS to cosmetically hide the floor seam FS and to provide additional support and strength to the floor seam FS. Alternatively, the chassis C can extend under a longer section of the body B so as to be a "quarter frame" or a "full frame" type. In the case of a full frame embodiment, the chassis C extends under and supports the full axial length L of the body B, in which case the draft arms DA are not provided, and the kingpin plate K is connected directly to the chassis C. The body B comprises a saddle SD (FIGS. 6 & 6B) located beneath the lower surface FLL of the floor FL at the forward end FB adjacent the kingpin plate K. The saddle SD supports the floor FL at the forward end and separates from the kingpin plate K during dumping operations when the hydraulic dump cylinder HC is extended to raise the forward end FB of the body B away from the kingpin plate K and draft arms DA1,DA2. The saddle SD abuts and mates with the kingpin plate K when the body B is in its non-dumping or "running" position as shown herein.

At least one axle X and preferably at least two axles X are connected to the chassis C. Each axle X includes left and right spaced-apart wheel and tire assemblies W located respectively on the opposite left and right lateral sides of the chassis C for supporting the body B for rolling movement on the road or other support surface RS. In the illustrated embodiment, the body B and chassis C do not pivot relative to each other when the body B is positioned in its load dumping position to dump its cargo through the open tailgate TG. Instead, the body B and chassis are tipped upward about the only or the rear-most pair of left/right wheel and tire assemblies W using the draft arms DA1,DA2 and lift cylinder HC as is known in the art when front of the body FB is elevated relative to the rear of the body FR during load dumping operations. In an alternative embodiment, the body B is hinged to the chassis C adjacent the tailgate TG and pivots relative to the chassis C about a horizontal axis as controlled by the lift cylinder HC during cargo dumping operations when front FB of the body is elevated relative to the rear FR of the body during load dumping operations.

The left and right sidewalls S1, S2 are each constructed from one or more sidewall sheets of aluminum alloy. As shown in FIGS. 1 & 2, the left sidewall S1 comprises front (first) and rear (second) sheets S1a,S1b that are welded together at a left (or first) sidewall seam S1S that is preferably aligned axially with the bolster BS. Each sheet S1a,S1b of the left sidewall S1 extends axially for approximately half of the length L of the trailer body B. Similarly, the right sidewall S2 comprises front (first) and rear (second) sheets S2a,S2b that are welded together at a right (or second) sidewall seam S2S that is also preferably aligned axially with the bolster BS. Each sheet S2a,S2b of the right sidewall S2 extends axially for approximately half of the length L of the trailer body B. The first (front) sidewall sheet S1a of the first sidewall S1 may be formed as a mirror image of the first (front) sidewall sheet S2a of the second sidewall S2. Similarly, the second (rear) sidewall sheet S1b of the first sidewall S1 may be formed as a mirror image of the second (rear) sidewall sheet S2b of the second sidewall S2.

As shown in FIGS. 6-7A, the sidewall sheets S1a,S1b and S2a,S2b are formed into a curved shape including a first or lower portion SP1 located adjacent and connected to the floor FL, and a second portion SP2 that is spaced upwardly and outwardly away from the floor FL. The first portion SP1 is continuously curved with a radius or other curve and the second portion SP2 is flat or planar and is arranged vertically in the assembled trailer T. The second portion SP2 of the first sidewall S1 is parallel and spaced-apart from the second portion SP2 of the second sidewall S2. As noted, the floor FL includes opposite left and right lateral edges FL1,FL2. As best seen in FIGS. 6 and 6B, the first (lower) portion SP1 of the first and second sidewall sheets S1a,S1b are welded to left lateral edge FL1 of the floor at a left floor seam FSL that extends axially and the first portion SP1 of the first and second sidewall sheets S2a,S2b are welded to right lateral edge FL2 of the floor at a right floor seam FSR that extends axially. The left and right floor seams FSL,FSR are preferably aligned with and covered externally by the left and right bottom rails BR1,BR2 for cosmetic reasons and so that the bottom rails BR1,BR2 strengthen and support the respective seams FSL,FSR.

The body B comprises left (first) and right (second) top rails TR1,TR2 are respectively welded or otherwise secured to the upper edges of the left and right sidewalls S1,S2. The top rails TR1,TR2 are defined as monolithic aluminum extrusions that extend continuously the full axial length of the sidewalls S1,S2. The left and right top rails TR1,TR2 are parallel and spaced apart with respect to each other and are also arranged parallel and spaced-apart from to the left and right bottom rails BR1,BR2. At the forward end FB of the body B, the left and right top rails TR1,TR2 are connected to the bulkhead BK through a bulkhead support structure or wrap brace ("wrap") WP (see FIG. 6A) that extends laterally and horizontally across the bulkhead BK adjacent the upper edge BK5 and that is connected at its opposite left and right ends WP1,WP2 to the left and right top rails TR1,TR2, respectively. The wrap WP comprises and aluminum alloy beam comprising multiple support walls WW and gussets WG that are interconnected to define a curved beam structure that conforms to the shape of and that is connected to the bulkhead BK on the inner/inside surface BK1 facing the cargo space SP. As such, the wrap W ties the left and right top rails TR1,TR2 together and also ties the bulkhead BK to both of the top rails TR1,TR2 for added strength. Above the wrap W, the body B comprises a tarp-cap region TC for storage of a rolled tarp (not shown) that can be selectively deployed to cover the open top of the cargo space SP.

The body B preferably also comprises left and right bulkhead support gussets BG1,BG2 connected to the bulkhead inner surface BKn. The left and right bulkhead support gussets BG1,BG2 are defined from aluminum extrusions or other aluminum structures and are respectively connected to the left and right panels BK1,BK2 of the bulkhead BK. The left and right bulkhead support gussets BG1,BG2 are preferably aligned respectively with the left and right bottom rails BR1,BR2 as shown in FIG. 6 to strengthen the bulkhead BK where it is connected to the bottom rails BR1,BR2.

As shown in broken lines in FIG. 6B, which is an enlarged portion of FIG. 6, the body B preferably comprises a first (left) pair of aluminum alloy cap-off gussets CG1a,CG1b (an upper cap-off gusset CG1a and a lower cap-off gusset CG1b) that are installed and welded between the left bottom rail BR1 and the inner surface BKn of the bulkhead BK to strengthen the connection between the left bottom rail BR1 and the bulkhead BK. Similarly, on the opposite side, the body B preferably comprises a second (right) pair of aluminum alloy cap-off gussets CG2a,CG2b (an upper cap-off gusset CG2a and a lower cap-off gusset CG2b) that are installed between the right bottom rail BR2 and the inner surface BKn of the bulkhead BK to strengthen the connection between the right bottom rail BR2 and the bulkhead BK. The upper cap-off gusset CG1a is welded to the bulkhead BK (inner surface BKn), the first leg L1 of the first (left) bottom rail BR1, and to the first sidewall S1, and the lower cap-off gusset CG1b is welded to the bulkhead BK (inner surface BKn), the second leg L2 of the first (left) bottom rail BR1, and the floor FL. Correspondingly, the upper cap-off gusset CG2a is welded to the bulkhead BK (inner surface BKn), the first leg L1 of the second (right) bottom rail BR2, and to the second sidewall S2, and the lower cap-off gusset CG2b is welded to the bulkhead BK (inner surface BKn), the second leg L2 of the second (right) bottom rail BR2, and the floor FL. These cap-off gussets CG1a,CG1b and CG2a, CG2b strengthen the respective left and right corners of the body B defined where the left and right bottom rails BR1, BR2 abut the bulkhead BK. FIG. 10 provides a view of the right side cap-off gusset pair CG2a,CG2b, and the left side cap-off gusset pair CG1a,CG1b is correspondingly formed and installed on the left side LS of the trailer T.

Referring specifically to FIGS. 1 & 2, and also FIG. 7, at the rear RT of the trailer T, the chassis C comprises subframe tower ST that joins a chassis subframe CS to the trailer body B. The trailer axles X are connected to the chassis subframe CS. As shown in the partial exploded view of FIG. 7A, the chassis subframe CS comprises left and right (first and second) spaced-apart subframe beams SB1,SB2 interconnected by multiple subframe cross-members SX. The subframe tower ST comprises left and right (first and second) tower bases or base members TB1,TB2. The subframe tower ST further comprises left and right (first and second) tower plates TP1,TP2 that are respectively connected to the left and right tower bases TB1,TB2. A plurality of tower cross-members TX extend between and interconnect the left and right tower bases TB1,TB2 and the left and right tower plates TP1,TP2. In one embodiment, the tower plates TP1, TP2 comprise aluminum alloy sheets and the tower bases TB1,TB2 comprise an aluminum alloy extrusion having the extrusion profile as shown in FIG. 8. The tower base extrusion TB1,TB2 can be used as either the left or right tower base TB1,TB2 depending upon its arrangement/orientation. The tower base extrusion TB1,TB2 comprises a flat body TBa and a wall notch TBb into which the tower plate TP1 or TP2 is received and secured by welding or otherwise.

FIG. 7B is a partial section view taken at line 7B-7B of FIG. 7 (the axles X and wheel/tire assemblies W are not shown in FIG. 7B). The chassis subframe CS is connected to the subframe tower as shown in the exploded view of FIG. 7A and the partial section view of FIG. 7B such that the subframe tower ST is fixedly secured to and supported on the chassis subframe CS (the chassis subframe CS is shown diagrammatically in FIG. 7B in broken lines). In the illustrated example, the body TBa of the tower base TB1 is supported on and connected to the first subframe beam SB1 and the body TBa of the tower base TB2 is supported on and connected to the second subframe beam SB2. The first and second tower bases TB1,TB2 can be respectively secured to the first and second subframe beams SB1,SB2 by fasteners, welding, or another suitable secure connection.

The subframe tower cross members TX are shaped to include a concavely curved upper edge TXU that is shaped to match the curve of the lower surface FLL of the floor FL such that the upper edge TXU of each subframe tower cross member TX closely abuts and supports the floor FL as shown in FIG. 7B. Each subframe tower cross member TX also comprises opposite left and right ends TXL,TXR. The left end TXL of each subframe tower cross member TX is abutted with and welded or otherwise connected to the left bottom rail BR1, and the opposite right end TXR of each subframe tower cross member TX is abutted with and welded or otherwise connected to the right bottom rail BR2. The left and right tower plates TP1,TP2 of the subframe tower assembly ST are also respectively welded or otherwise connected to the left and right bottom rails BR1,BR2 such that the left tower plate TP1 extends between and interconnects the left tower base TB1 and the left bottom rail BR1 and the right tower plate TP2 extends between and interconnects the right tower base TB2 and the right bottom rail BR2. In this manner, forces from the chassis subframe CS are directed laterally outward and upward into the left and right bottom rails BR1,BR2 through each of the subframe tower cross members TX so that these forces are then transmitted and dissipated axially along the left and right bottom rails BR1,BR2 throughout the body B. The subframe tower cross members TX also evenly support the floor by way of their curved upper edges TXU.

A protective replaceable polymeric liner PL (partially shown in FIG. 3) can be included to cover and protect the entire upper surface FLU of the floor FL.

As shown in FIG. 7, the body B comprises an air deflector AD that is angled rearward as shown to reduce aerodynamic drag under the trailer body B in the region of the chassis C. The air deflector AD is connected to and covers the front of the subframe tower ST and front of the chassis subframe CS that face toward the front of the trailer/body. FIGS. 1 & 2 shows that the body comprises left and right fenders FD located respectively on the left and right sides LS,RS of the trailer T. In FIGS. 1 & 2, the fenders are shown as being vertical, but they can each be sloped rearward as shown in broken lines in FIG. 7 for the left fender FD to reduce aerodynamic drag.

The disclosure has been described with reference to the exemplary embodiments. Modifications and alterations will occur to others upon reading and understanding the preceding detailed description, and it is intended that the disclosure be construed as including all such modifications and alterations in so far as they come within the scope of the appended claims or the equivalents thereof.

The invention claimed is:
1. A trailer comprising:
a chassis comprising at least one axle, said axle comprising left and right wheel and tire assemblies that support the chassis for rolling movement on a surface;
a body supported on the chassis, said body comprising: (i) left and right sidewalls spaced apart from each other and respectively located on opposite left and right lateral sides of the body; (ii) a curved floor that extends between the left and right sidewalls; (iii) a bulkhead located at a front end of the body and extending between the left and right sidewalls; (iv) a tailgate located a rear end of the body and extending between the left and right sidewalls, said tailgate movable relative to the left and right sidewalls between an opened position and a closed position; (v) an open-top cargo space for containing an associated bulk commodity defined between said left and right sidewalls, said floor, said bulkhead, and said tailgate, wherein a dump opening of the cargo space is defined between the left and right sidewalls and is blocked by said tailgate when said tailgate is in its closed position and is at least partially unblocked when said tailgate is in its opened position;

said bulkhead comprising a one-piece aluminum alloy bulkhead sheet formed into a three-panel shape comprising a left panel, a right panel, and a central panel, said bulkhead comprising opposite inner and outer sides wherein said inner side is oriented toward the cargo space and a respective obtuse angle is defined between the central panel and each of the left and right panels on said inner side of said bulkhead.

2. The trailer as set forth in claim 1, wherein said bulkhead is arranged in a forward sloping orientation with a bottom edge of the bulkhead that is adjacent to the floor located closer to said tailgate relative to an upper edge of said bulkhead that is spaced above said floor such that the left and right panels of the bulkhead diverge outwardly away from the central panel of the bulkhead in opposite directions as they extend rearwardly relative to the central panel.

3. The trailer as set forth in claim 2, further comprising:
a lift cylinder frame located adjacent the outer side of the bulkhead, said lift cylinder frame comprising left and right cylinder mounting beams;
a hydraulic cylinder operably connected between the cylinder mounting beams for selectively elevating the front end of the body relative to the rear end of the body.

4. The trailer as set forth in claim 3, further comprising a hydraulic cylinder cover that at least partially covers the hydraulic cylinder to reduce aerodynamic drag, said hydraulic cylinder cover comprising: (i) a curved central portion that extends between the left and right cylinder mounting beams of the lift cylinder frame; and (ii) opposite left and right mounting flanges that are respectively connected to the left and right cylinder mounting beams of the lift cylinder frame;
wherein the curved central portion comprises an outer convexly curved surface that is oriented away from the hydraulic cylinder.

5. The trailer as set forth in claim 2, wherein said floor comprises first and second floor sheets of aluminum that are joined together by welding at a primary floor seam that extends between the left and right sidewalls.

6. The trailer as set forth in claim 5, wherein:
the left sidewall comprises first and second sidewall sheets of aluminum joined together by welding at a left sidewall seam;
the right sidewall comprises first and second sidewall sheets of aluminum joined together by welding at a right sidewall seam;
said trailer further comprises a bolster that extends under the floor and that is axially aligned with and covers the primary floor seam.

7. The trailer as set forth in claim 6, wherein said first and second sidewall sheets of said left sidewall and said first and second sheets of said right sidewall each comprise: (i) a continuously curved first portion connected to the floor; and (ii) a planar second portion that extends vertically upwardly from the first curved portion;
wherein an axially extending left floor seam is defined where the first portion of the first and second sheets of the left sidewall are welded to a left lateral edge of the floor and an axially extending right floor seam is defined where the first portion of the first and second sheets of the right sidewall are welded to a right lateral edge of the floor.

8. The trailer as set forth in claim 7, further comprising:
a left bottom rail that extends axially between said front and rear ends of said body and that covers said left floor seam, said left bottom rail comprising first and second left bottom rail legs that intersect at a 90-degree angle and that are connected respectively to the left sidewall and the floor;
a right bottom rail that extends axially between said front and rear ends of said body and that covers said right floor seam, said right bottom rail comprising first and second right bottom rail legs that intersect at a 90-degree angle and that are connected respectively to the right sidewall and the floor.

9. The trailer as set forth in claim 8, further comprising:
a left upper cap-off gusset welded between the first leg of the left bottom rail and the inner side of said bulkhead;
a left lower cap-off gusset welded between the second leg of the left bottom rail and the inner side of said bulkhead;
a right upper cap-off gusset welded between the first leg of the right bottom rail and the inner side of said bulkhead;
a right lower cap-off gusset welded between the second leg of the right bottom rail and the inner side of said bulkhead;
wherein said gussets strengthen a connection between the left and right bottom rails and the bulkhead.

10. The trailer as set forth in claim 9, further comprising left and right bulkhead support gussets connected to the bulkhead inner side, wherein the left and right bulkhead support gussets are respectively connected to the left and right panels of the bulkhead and are aligned respectively with the left and right bottom rails to strengthen the bulkhead where it is connected to the bottom rails.

11. The trailer as set forth in claim 10, further comprising:
left and right top rails respectively connected to the left and right sidewalls and each extending axially between the front and rear ends of the body;
a wrap brace that extends laterally across the bulkhead and that comprises opposite left and right ends that are respectively connected to the left and right top rails.

12. The trailer as set forth in claim 1, wherein said chassis comprises:
a chassis subframe comprising left and right subframe beams interconnected by multiple subframe cross-members;
a subframe tower that joins the chassis subframe to the body;
wherein the at least one axle is connected to the chassis subframe.

13. The trailer as set forth in claim 12, wherein the subframe tower comprises:
left and right tower bases connected respectively to the left and right subframe beams;
left and right tower plates that are respectively connected to the left and right tower bases and that are respectively connected to the left and right bottom rails; and
a plurality of tower cross-members that extend between and interconnect the left and right tower bases and that extend between and interconnect the left and right tower plates.

14. The trailer as set forth in claim 13, wherein:
each tower cross-member comprises a left end connected to the left bottom rail and an opposite right end connected to the right bottom rail; and
each tower cross-member comprises a curved upper edge that contacts and supports said floor.

15. The trailer as set forth in claim 14, wherein:
said left end of each tower cross-member is welded to said second leg of said left bottom rail; and,
said right end of each tower cross-member is welded to said second leg of said right bottom rail.

16. The trailer as set forth in claim 14, wherein said left and right tower bases each comprise a one-piece aluminum extrusion including a flat body and a wall notch;
said flat body of said left tower base connected to said left subframe beam and said wall notch of said left tower base engaged with said left tower plate;
said flat body of said right tower base connected to said right subframe beam and said wall notch of said right tower base engaged with said right tower plate.

17. The trailer as set forth in claim 16, further comprising an air deflector that is connected to and covers a front of said chassis subframe and subframe tower.

* * * * *